(12) United States Patent
Sheng

(10) Patent No.: US 10,684,536 B2
(45) Date of Patent: Jun. 16, 2020

(54) PORTABLE IMAGE CAPTURE DEVICE HAVING HANDLE ASSEMBLY DISPOSED ON MAIN BODY AND PORTABLE IMAGE CAPTURE SYSTEM USING SUCH PORTABLE IMAGE CAPTURE DEVICE

(71) Applicant: AVISION INC., Hsinchu (TW)

(72) Inventor: Shao-Lan Sheng, Hsinchu (TW)

(73) Assignee: AVISION INC., Hsinchu (TW)

( * ) Notice: Subject to any disclaimer, the term of this patent is extended or adjusted under 35 U.S.C. 154(b) by 14 days.

(21) Appl. No.: 16/184,421

(22) Filed: Nov. 8, 2018

(65) Prior Publication Data

US 2019/0204720 A1 Jul. 4, 2019

(30) Foreign Application Priority Data

Jan. 3, 2018 (TW) .............................. 107100148 A

(51) Int. Cl.
*G03B 17/56* (2006.01)
*G03B 15/00* (2006.01)
(Continued)

(52) U.S. Cl.
CPC .......... *G03B 17/563* (2013.01); *G03B 11/045* (2013.01); *G03B 15/00* (2013.01);
(Continued)

(58) Field of Classification Search
CPC ...... G03B 15/06; G03B 17/563; G03B 11/04; G03B 11/045; G03B 15/03;
(Continued)

(56) References Cited

U.S. PATENT DOCUMENTS 6,019,286 A 2/2000 Li et al.
6,396,481 B1 5/2002 Challa et al.
(Continued)

FOREIGN PATENT DOCUMENTS

CN 2710015 Y 7/2005
CN 2724044 Y 9/2005
(Continued)

OTHER PUBLICATIONS

Tawainese Office Action based on Application No. 10721039570; dated Nov. 7, 2018.

*Primary Examiner* — Abdelaaziz Tissire
(74) *Attorney, Agent, or Firm* — Muncy, Geissler, Olds & Lowe, P.C.

(57) ABSTRACT

A portable image capture device includes a main body, an image capture assembly and a handle assembly. The main body includes a top surface, a bottom side disposed opposite the top surface, and an internal space disposed between the top surface and the bottom side. The image capture assembly disposed in the internal space faces the bottom side and performs image capturing. The handle assembly includes a handle part and a start button disposed beside the handle part. The handle assembly is disposed on the main body, and
(Continued)

the image capture assembly is separated from the handle assembly and disposed under the top surface and above the bottom side so that a user uses one single hand to operate the portable image capture device and control image capturing timings.

20 Claims, 8 Drawing Sheets

(51) Int. Cl.
  *G03B 11/04*  (2006.01)
  *H04N 5/232*  (2006.01)
  *G06K 9/22*  (2006.01)
  *H04N 5/225*  (2006.01)
  *G06K 9/00*  (2006.01)

(52) U.S. Cl.
  CPC ........... *G06K 9/228* (2013.01); *H04N 5/2252* (2013.01); *H04N 5/23203* (2013.01); *G06K 9/00442* (2013.01); *H04N 5/2251* (2013.01)

(58) Field of Classification Search
  CPC ............. G03B 9/08–54; H04N 5/2252; H04N 5/2256; H04N 5/2254; H04N 5/2253; H04N 5/2257; H04N 5/232; H04N 5/2353; H01H 15/025; H01H 19/025; H01H 21/025; H01H 23/025; G10H 220/061
  See application file for complete search history.

(56) References Cited

U.S. PATENT DOCUMENTS

| | | | | |
|---|---|---|---|---|
| 2010/0127626 | A1* | 5/2010 | Altonen | H05B 39/085 |
| | | | | 315/129 |
| 2011/0267661 | A1* | 11/2011 | Hayes | H04N 1/00543 |
| | | | | 358/474 |
| 2011/0277219 | A1* | 11/2011 | Demus | A41D 27/205 |
| | | | | 2/247 |
| 2013/0057694 | A1* | 3/2013 | Petricoin, Jr. | H04N 7/18 |
| | | | | 348/155 |
| 2015/0256704 | A1 | 9/2015 | Chen et al. | |
| 2015/0256799 | A1* | 9/2015 | Saggiomo | G08B 13/19619 |
| | | | | 348/143 |
| 2017/0278383 | A1* | 9/2017 | Dimberg | H05B 45/00 |
| 2018/0255894 | A1* | 9/2018 | Knittel | A45C 3/06 |

FOREIGN PATENT DOCUMENTS

| | | |
|---|---|---|
| CN | 201286132 Y | 8/2009 |
| CN | 103776998 A | 5/2014 |
| CN | 203896384 U | 10/2014 |
| CN | 205568924 U | 9/2016 |
| CN | 207820047 U | 9/2018 |
| JP | 2015023352 A | 2/2015 |
| TW | D132134 | 11/1998 |
| TW | M545912 U | 7/2017 |

\* cited by examiner

PORTABLE IMAGE CAPTURE DEVICE HAVING HANDLE ASSEMBLY DISPOSED ON MAIN BODY AND PORTABLE IMAGE CAPTURE SYSTEM USING SUCH PORTABLE IMAGE CAPTURE DEVICE

CROSS-REFERENCE TO RELATED APPLICATIONS

This application claims priority of No. 107100148 filed in Taiwan R.O.C. on Jan. 3, 2018 under 35 USC 119, the entire content of which is hereby incorporated by reference.

BACKGROUND OF THE INVENTION

Field of the Invention

This disclosure relates to a portable image capture device and a portable image capture system using the same, and more particularly to a portable image capture device including an image capture assembly and a handle assembly disposed on a main body, and a portable image capture system using the portable image capture device.

Description of the Related Art

Existing types of bills include bills of exchange, checks, promissory notes and the like. The forms of bills issued by different banks are also different. The contents are nothing more than the bill holder, payee, drawer, designated payer, amount, currency and the like. For the bank that receives the bill, in order to achieve the purpose of data induction and accurate records on the paper notes of different bank notes, the data is manually created words by words. Such the operation mode leads to the time-consuming systemic operation, and may also lead to a mistake caused by human error.

Basically, image capture technology is required to solve such technical solutions in conjunction with the feature recognition (character recognition, graphic recognition or the like), then the information on the bill can be automatically obtained, and the information can be systematized.

Generally, a conventional method is to use a mobile phone photographing software to perform such a behavior mode. However, the mobile phone requires the user to spend time to determine where to capture the image, and the camera of the mobile phone is a zoom camera with an adjustable focal length, so that a period of focusing time is required upon image capturing. In addition, the indoor image capturing effect of the mobile phone has the poor readability due to the insufficient light; and the outdoor image capturing effect of the mobile phone results in that the image content cannot be precisely analyzed and identified due to the over exposure or the reflective image. Consequently, the user needs to spend a lot of time in fixing the position of the image and determining the focal length. In addition, the light cannot be easily controlled, and the clarity of the captured image is not as good as expected.

In addition, TW D132134 discloses a passport data reader, or US20150256704 discloses a passport image capture device. Such the technology can capture an image and analyze the data of the captured image. However, the user needs to place the original with the to-be-analyzed image on the platen of the electronic device. When the original, such as a package, is large in volume, the original cannot be placed on the electronic device. Meanwhile, such the electronic device has the large volume, and the user cannot carry the electronic device. So, the problem that a large-scale electronic device is needed to perform the image capturing needs to be solved.

In summary, how to quickly organize the correct and systematic electronic data according to the paper documents provided by different banks and different types of notes is an issue that needs to be urgently solved now.

BRIEF SUMMARY OF THE INVENTION

It is therefore an objective of this disclosure to provide a portable image capture device and a portable image capture system using the same to solve the above-mentioned problems.

In order to achieve the above-mentioned objective, this disclosure provides a portable image capture device including a main body, an image capture assembly and a handle assembly. The main body includes a top side, a bottom side disposed opposite the top side, and an internal space disposed between the top side and the bottom side. The image capture assembly disposed on the top side faces the bottom side and performs image capturing. The handle assembly includes a handle part and a start button disposed beside the handle part. The handle assembly is disposed on the main body so that a user uses one single hand to operate the portable image capture device and control image capturing timings.

In one of the embodiments, this disclosure discloses a portable image capture device including a main body, an image capture assembly, a handle assembly and a first signal connection assembly. The main body includes a top side, a bottom side disposed opposite the top side, and an internal space disposed between the top side and the bottom side. The image capture assembly disposed on the top side faces the bottom side and performs image capturing. The handle assembly disposed on the main body includes a handle part and a start button disposed beside the handle part, so that the user can operate with one single hand. The first signal connection assembly is used for coupling image signals or other manipulation signals of the image capture assembly to an electronic device, which is a computer or a server.

In order to achieve the above-mentioned objective, this disclosure discloses a portable image capture system including an electronic device and a portable image capture device. The electronic device includes a processor, a data storage area and a second signal connection assembly. The processor is used for transmitting the image data and analyzing the received image data to obtain analyzed data. The data storage area is used for storing the analyzed data. The second signal connection assembly is used for transmitting an instruction of the processor and receiving the image. The portable image capture device includes a main body, an image capture assembly, a handle assembly and a first signal connection assembly. The main body includes a top side, a bottom side disposed opposite the top side, and an internal space disposed between the top side and the bottom side. The image capture assembly disposed on the top side faces the bottom side and performs image capturing. The handle assembly disposed on the main body includes a handle part and a start button disposed beside the handle part, so that the user can operate with one single hand (one single hand holds the handle part and controls the start button at the same time to control the image capturing timings). The first signal connection assembly is used for coupling/transmitting the image signals or other manipulation signals of the portable image capture device to the electronic device. The start button generates a first signal transmitted to the processor, and then the processor correspondingly emits a second signal to enable the image capture assembly to perform image capturing to generate an image signal, and transmit the image signal back to the processor, which analyzes the data of the image.

In summary, this disclosure utilizes the main body of the portable image capture device to concentrate the light source inside the main body, so that the image under the bottom side of the main body is fully illuminated. In the process of capturing images of multiple packages, the lighting environment in the main body is stable and single. As long as the optimum exposure of the light ray of the first package is determined, the images of the subsequent packages can be continuously captured according to the parameters of the first package or with minor parameter adjustments being performed, thereby saving the parameter adjustment time. The handle and the start button are disposed on the main body, so that the user can operate the portable image capture device with one single hand. The main work of processing information is performed by the computer or server disposed outside the electronic device, so that the components and weights of the portable image capture device can be simplified and reduced. Consequently, when the user manipulates the portable image capture device, the burden on the wrist is minimized. When the image data is transmitted to the electronic device, the electronic device can perform an optimal speed calculation and analysis and store the analyzed and identified data to the system. In this manner, this disclosure can effectively reduce the manpower and time required for preparing the paper document data into the electronic system, thereby achieving the objective of data systemization.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

The directional terms, such as up, down, left, right, front, rear and the like, mentioned in the following embodiments refer only to the directions of the accompanying drawings. Therefore, the used directional terms are intended to illustrate but not to limit this disclosure.

Figure 1A:
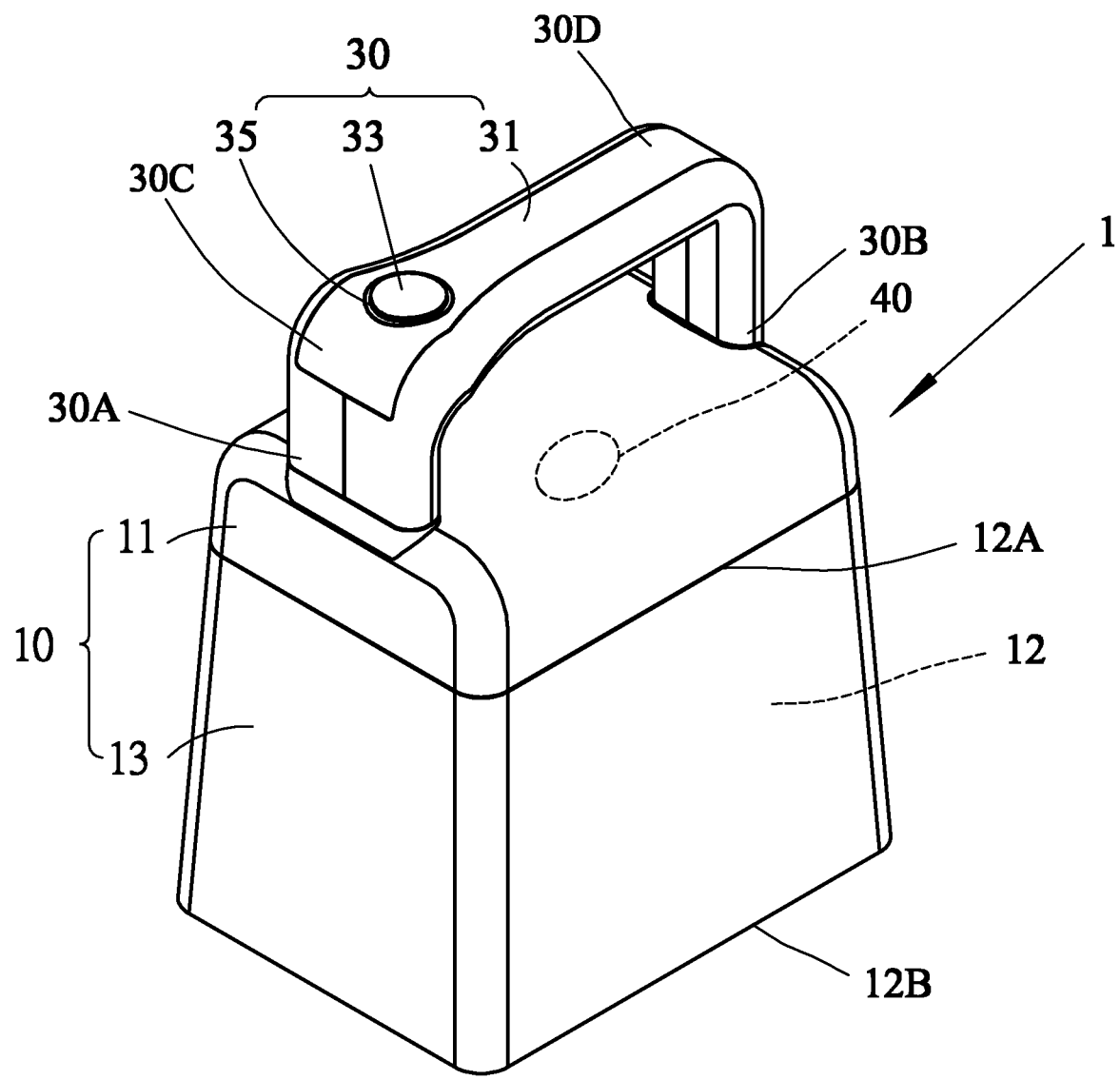
FIG. 1A is a schematic outlook view showing a portable image capture device according to a first embodiment of this disclosure.
Figure 1B:
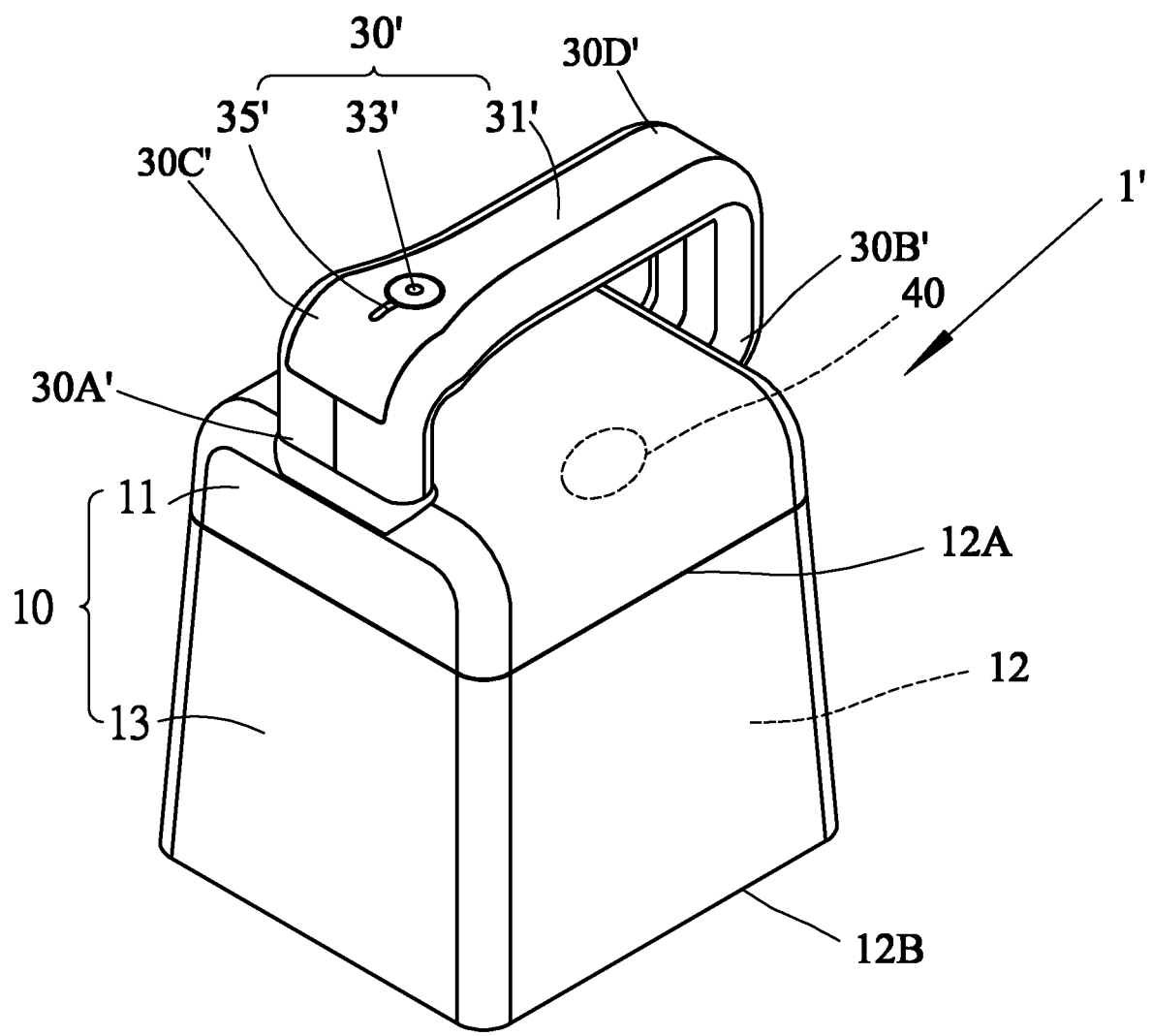
FIG. 1B is a schematic outlook view showing a portable image capture device according to a second embodiment of this disclosure.

Please refer to FIGS. 1A and 1B. FIG. 1A is a schematic outlook view showing a portable image capture device 1 according to a first embodiment of this disclosure, and FIG. 1B is a schematic outlook view showing a portable image capture device 1' according to a second embodiment of this disclosure. In FIG. 1A, the portable image capture device 1 includes a main body 10, an image capture assembly 40 (see also FIG. 4) and a handle assembly 30. The main body 10 includes a top side 12A, a bottom side 12B disposed opposite the top side 12A, and an internal space 12 disposed between the top side 12A and the bottom side 12B. The image capture assembly 40, which includes a complementary metal-oxide semiconductor (CMOS) image sensor and a lens, such as those used in a digital camera, and is disposed on the top side 12A, faces the bottom side 12B to perform image capturing to generate an image signal. The handle assembly 30 includes a handle part 31, which may be a handle to be held by a user, and a start button 33 disposed beside the handle part 31 or on an edge of the handle part 31. The handle assembly 30 is disposed outside the main body 10 or on the outer side of the main body 10, so that the user can use only one single hand to operate the portable image capture device 1 and control image capturing timings. Similarly, in FIG. 1B, the portable image capture device 1' includes a main body 10, an image capture assembly 40 and a handle assembly 30'. The main body 10 includes a top side 12A, a bottom side 12B disposed opposite the top side 12A, and an internal space 12 disposed between the top side 12A and the bottom side 12B. The image capture assembly 40 disposed on the top side 12A faces the bottom side 12B to perform image capturing. The handle assembly 30' includes a handle part 31' and a start button 33' disposed beside the handle part 31' or on an edge of the handle part 31'. The handle assembly 30' is disposed outside the main body 10 or on the outer side of the main body 10, so that a user can use only one single hand to operate the portable image capture device 1' and control image capturing timings. The camera in the image capture assembly 40 may be a zoom camera or a fixed-focus camera. If the zoom camera is provided, then the portable image capture device 1 may capture a near image, may also capture a distant image, and may be a multi-functional and practical image capture device. If the fixed-focus camera is provided, then the focal length from the camera to the bottom side is fixed, and the focusing time required by the zoom camera can be eliminated, and the efficiency of analyzing image data by the user using clear images captured by the portable image capture device 1' can be further enhanced.

In the first and second embodiments, the main body 10 includes a connection part 11 and a mask part 13, and the connection part 11 abuts upon the mask part 13. The connection part 11 is used to connect the main body 10 to the handle assembly 30. A closed space is formed between the mask part 13 and the bottom side of the main body when a to-be-captured image is placed at a position under the bottom side of the main body. When the image capture assembly 40 enables the image capture function, the light source will be concentrated in the enclosed space and will not be scattered outside. So, the image under the bottom side of the main body will be clearly captured without consuming too much power to increase the brightness, and it is unnecessary to consider too many complicated factors to generate too many situations in the software design. According to another definition, the main body 10 includes a top surface 12C, a bottom side 12B disposed opposite the top surface 12C, and an internal space 12 disposed between the top surface 12C and the bottom side 12B. In this case, the image capture assembly 40 is disposed in the internal space 12, and the image capture assembly 40 is separated from the handle assembly 30 and disposed under the top surface 12C and above the bottom side 12B. Also, the image capture assembly 40 is disposed under a gap 14 formed between the top surface 12C and the handle assembly 30.

In the first and second embodiments, the main body 10 includes a connection part 11 and a mask part 13, and the connection part 11 abuts upon the mask part 13. The connection part 11 is used to connect the main body 10 to the handle assembly 30. A closed space is formed between the mask part 13 and the bottom side of the main body when a to-be-captured image is placed at a position under the bottom side of the main body. When the image capture assembly 40 enables the image capture function, the light source will be concentrated in the enclosed space and will not be scattered outside. So, the image under the bottom side of the main body will be clearly captured without consuming too much power to increase the brightness, and it is unnecessary to consider too many complicated factors to generate too many situations in the software design.

Figure 2A:
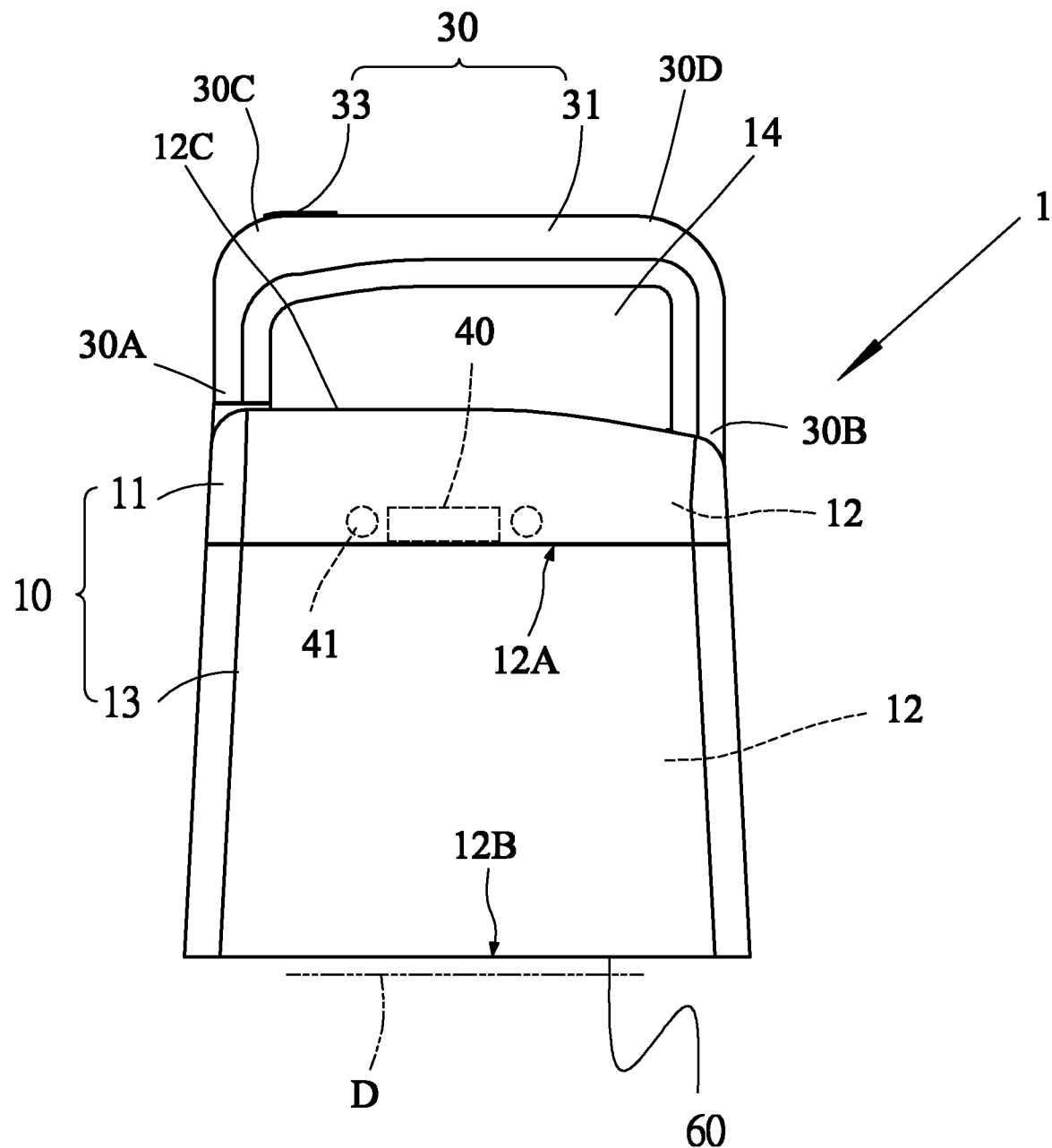
FIG. 2A is a side view showing the portable image capture device according to the first embodiment of this disclosure.
Figure 2B:
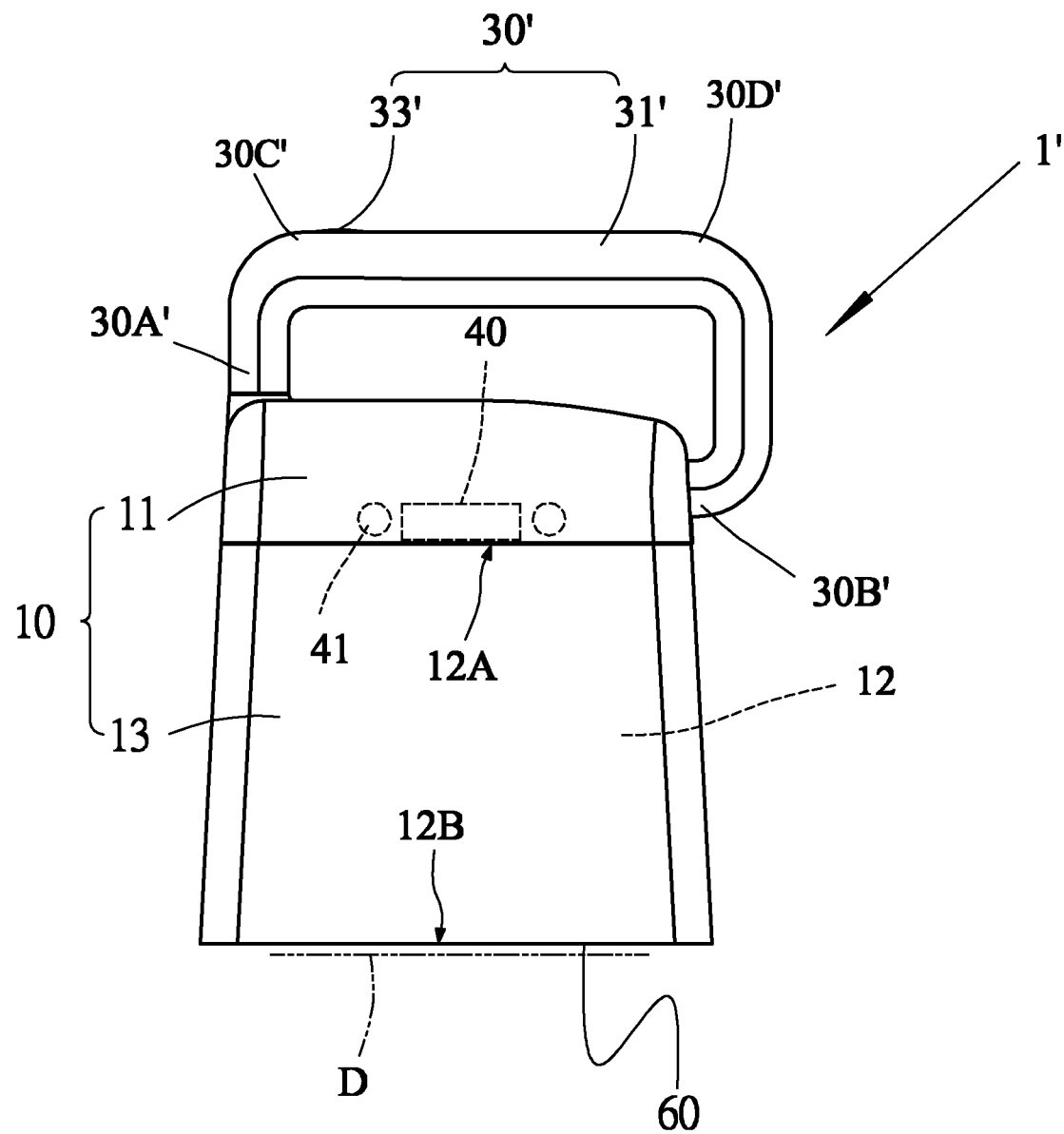
FIG. 2B is a side view showing the portable image capture device according to the second embodiment of this disclosure.

Please refer to FIGS. 2A and 2B. FIG. 2A is a side view showing the portable image capture device according to the first embodiment of this disclosure. FIG. 2B is a side view showing the portable image capture device according to the second embodiment of this disclosure. The portable image capture device 1/1' of this disclosure is used to capture an image of a document D. The document D is placed below the bottom side 12B and may be in contact with or not in contact with the bottom side 12B. The document D includes, for example but without limitation to, a bill of exchange, a check, a promissory note, a package or the like. In one embodiment, the connection part 11 is integrally formed jointly with the mask part 13. In another embodiment, the connection part 11 abuts upon the mask part 13.

In FIG. 2A, the connection part 11 is disposed between the mask part 13 and the handle assembly 30. One side of the connection part 11 adjacent to the mask part 13 is used for the installation of the image capture assembly 40, and the outer side of the connection part 11 is used for the installation of the handle (handle part). In this embodiment, two ends (a first end 30A and a second end 30B) of the handle assembly 30 may be disposed on the same surface of the connection part 11. In FIG. 2B, the connection part 11 is disposed between the mask part 13 and the handle assembly 30'. One side of the connection part 11 adjacent to the mask part 13 is used for the installation of the image capture assembly 40, and the outer side of the connection part 11 is used for the installation of the handle. In this embodiment, two ends (a first end 30A' and a second end 30B') of the handle assembly 30' may be disposed on adjacent and different surfaces of the connection part 11, which are adjacent lateral sides or side surfaces. In FIGS. 2A, 2B, 3A and 3B. the start button 33/33' is disposed on a front end 30C/30C' of the handle assembly 30/30' having a front width W1/W1' greater than a rear end 30D/30D' of the handle assembly 30/30' having a rear width W2/W2'.

In FIG. 2A, the connection part 11 is disposed between the mask part 13 and the handle assembly 30. One side of the connection part 11 adjacent to the mask part 13 is used for the installation of the image capture assembly 40, and the outer side of the connection part 11 is used for the installation of the handle (handle part). In this embodiment, two ends (a first end 30A and a second end 30B) of the handle assembly 30 may be disposed on the same surface of the connection part 11. In FIG. 2B, the connection part 11 is disposed between the mask part 13 and the handle assembly 30'. One side of the connection part 11 adjacent to the mask part 13 is used for the installation of the image capture assembly 40, and the outer side of the connection part 11 is used for the installation of the handle. In this embodiment, two ends (a first end 30A' and a second end 30B') of the handle assembly 30' may be disposed on adjacent and different surfaces of the connection part 11, which are adjacent lateral sides or side surfaces.

In the technical disclosure, the handle part 31/31' is disposed above the main body 10. When the user presses the start button 33/33' to capture the image of the document D, the gravity of the whole machine presses the document D vertically downwards. By using such a technical solution, when a large number of images are to be captured, the wrist of the user cannot be easily injured, the machine is also not easily shaken due to the weight of the entire machine, and the failure rate of capturing the images is greatly reduced.

In FIG. 2A, the connection part 11 is disposed between the mask part 13 and the handle assembly 30. One side of the connection part 11 adjacent to the mask part 13 is used for the installation of the image capture assembly 40, and the outer side of the connection part 11 is used for the installation of the handle. In this embodiment, the two ends (the first end 30A and the second end 30B) of the handle assembly 30 may be disposed on one surface of the main body 10. In FIG. 2B, the two ends (the first end 30A' and the second end 30B') of the handle assembly 30' are disposed on adjacent and different surfaces of the main body 10, which are adjacent lateral sides or side surfaces.

Figure 3A:
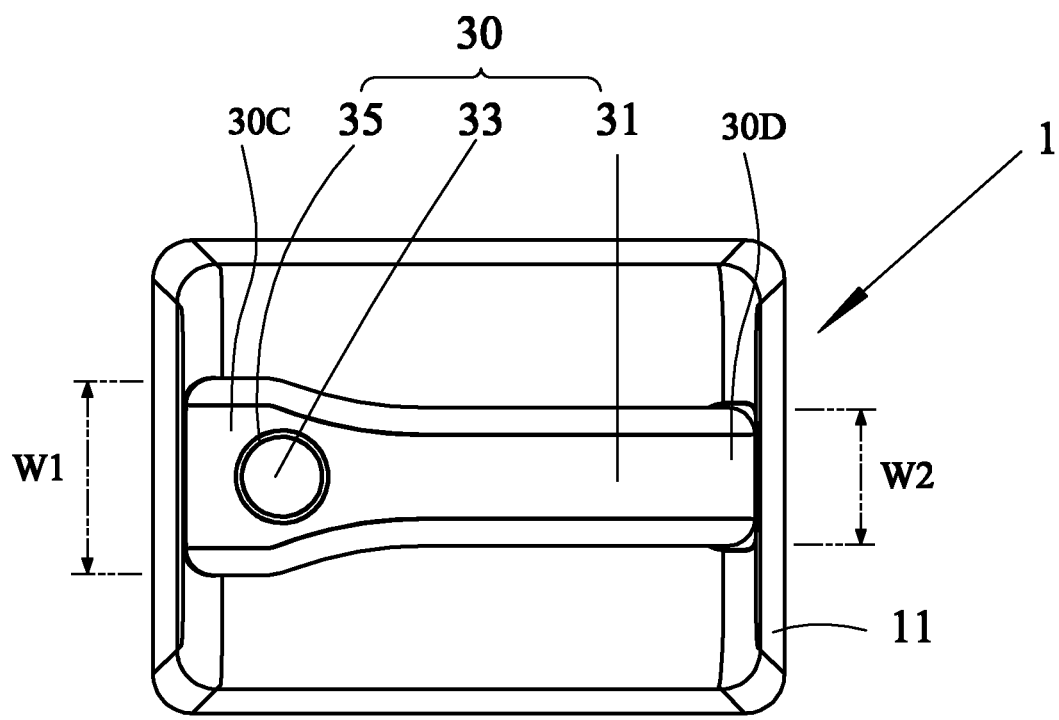
FIG. 3A is a top view showing the portable image capture device according to the first embodiment of this disclosure.
Figure 3B:
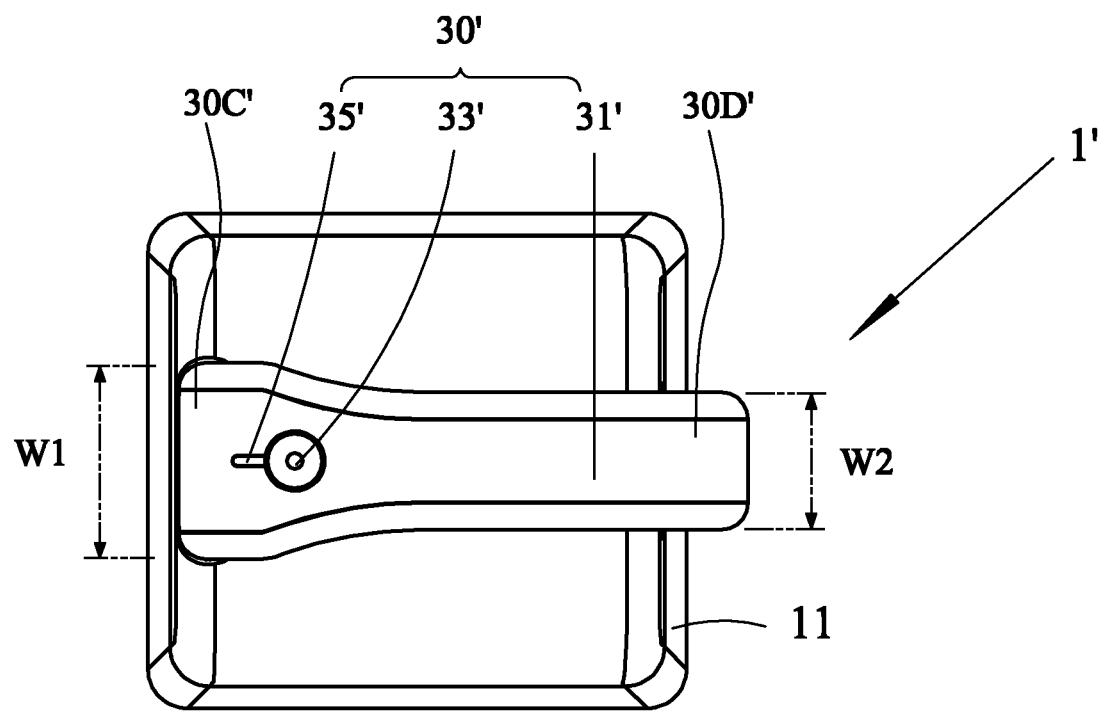
FIG. 3B is a top view showing the portable image capture device according to the second embodiment of this disclosure.

Please refer to FIGS. 3A and 3B. FIG. 3A is a top view showing the portable image capture device according to the first embodiment of this disclosure. FIG. 3B is a top view showing the portable image capture device according to the second embodiment of this disclosure. The handle assembly 30 described in FIG. 3A further includes an indicator 35 abutting upon the start button 33. In FIG. 3B, an indicator 35' abuts upon the start button 33'. In another embodiment, the start button can be designed as a transparent or light-permeable material, so that the indicator is integrally formed jointly with the start button (not shown). Consequently, the user can easily receive the message of the indicator to confirm the used state of the portable image capture device 1. Alternatively, the indicator may surround the start button. As shown in FIGS. 3A and 3B, in the technical content of this disclosure, the start buttons 33 and 33' are disposed at the non-intermediate positions of the handle assemblies 30 and 30', may also be disposed on front ends 30C and 30C" of the handle assemblies 30 and 30', disposed on edges of the handle parts 31 and 31', or disposed at positions adjacent to the handle parts 31 and 31'. Such an arrangement facilitates the user to pick up the portable image capture device 1 by one single hand and manipulate the start buttons 33 and 33' to perform image capture operations with the fingers of the same hand. In addition, because only one hand of the user can hold the handle part 31/31' and press the start button 33/33', the preferred technical solution is such that the handle part 31/31' has the small cross-sectional area to facilitate holding, and the start button 33/33' has a large surface area to avoid press errors.

The image capture assembly 40 is disposed on the top side 12A of the main body 10, and is preferably disposed at the middle of the top side 12A. The image capture assembly 40 is disposed on the top side 12A facing the bottom side 12B to capture the image of the document disposed under the bottom side 12B. A light source 41 (in FIG. 2a/2b) may, for example but without limitation to, be disposed around the image capture assembly 40. In order to achieve the objective of capturing clear images, the portable image capture device 1 further provides a transparent substrate 60 on the bottom side 12B of the main body 10, and the transparent substrate 60 may be made of a material, such as glass, polycarbonate (PC), acrylonitrile butadiene styrene (ABS) or the like, having the high transmittance. The transparent substrate 60 is disposed on the bottom side 12B of the main body 10, so that the document D can be pressed to avoid the data analysis accuracy of the captured image from being deteriorated due to the wrinkling of the document D.

Figure 4:
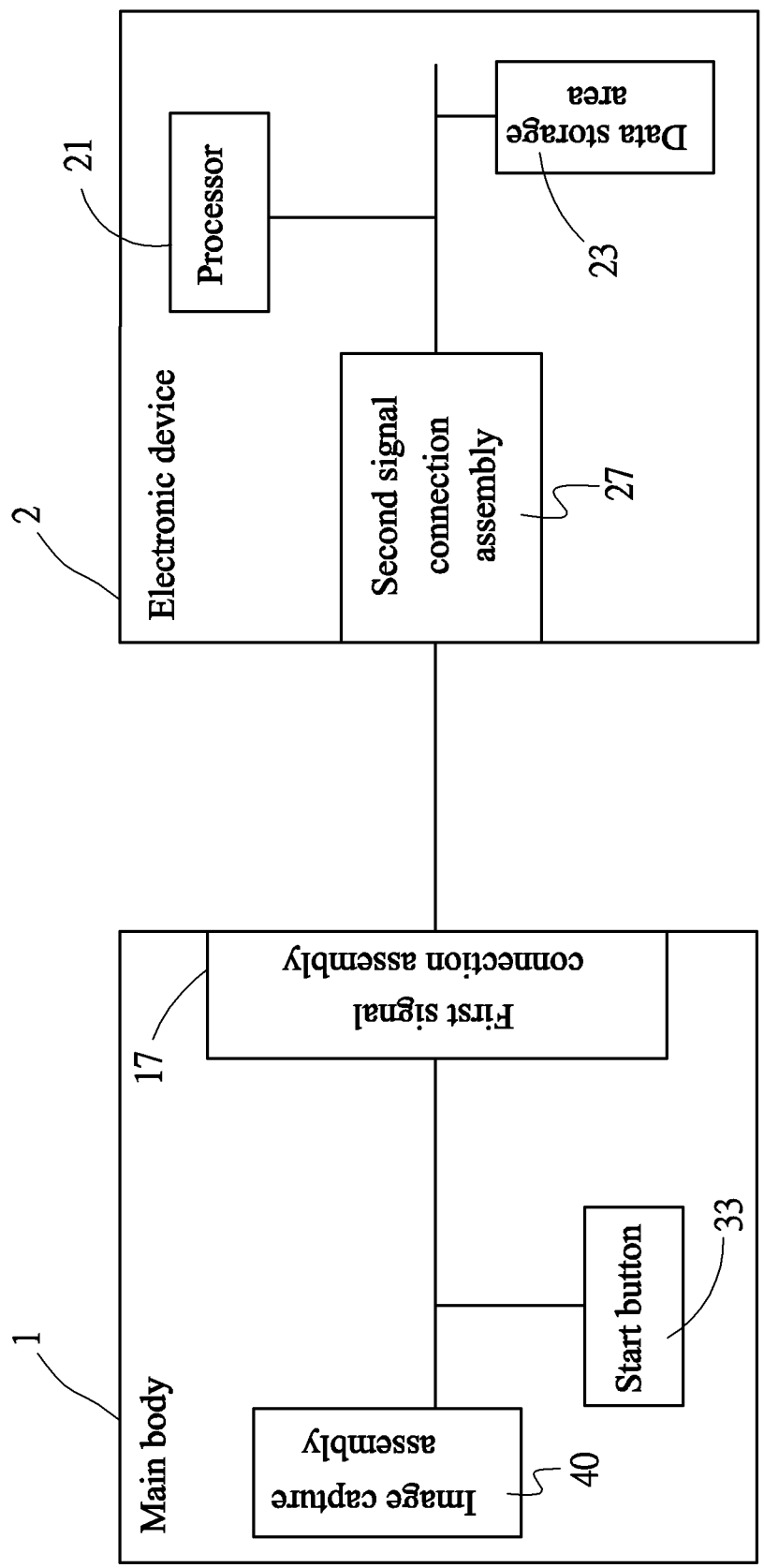
FIG. 4 is a block diagram of a portable image capture system of this disclosure.

A portable image capture device 1 according to another embodiment of this disclosure includes the main body 10, the image capture assembly 40, the handle assembly 30/30' and a first signal connection assembly 17 (see FIG. 4). The main body 10 includes the top side 12A, the bottom side 12B disposed opposite the top side 12A, and an internal space 12 disposed between the top side 12A and the bottom side 12B. The image capture assembly 40 disposed on the top side 12A faces the bottom side 12B to perform image capturing. The handle assembly 30/30' disposed outside the main body 10 includes the handle part 31/31' and the start button 33/33' disposed beside the handle part 31/31' or on an edge of the handle part 31/31', so that the user can operate with one single hand. The first signal connection assembly 17 is used for coupling image signals or other manipulation signals of the image capture assembly 40 to an electronic device, which is a computer or a server.

The first signal connection assembly 17 for coupling the image signals or other manipulation signals of the image capture assembly 40 to the electronic device may be a wired or wireless connection assembly. The first signal connection assembly 17 belonging to the wired connection assembly may be a universal serial bus (USB), Ethernet, a high-definition multimedia interface (HDMI) or the like. The wireless connection interface of the wireless connection assembly may be Bluetooth, WiFi, USB wireless or the like. The foregoing is a feasible implementation mode of the present connection between the portable image capture device 1 and the electronic device 2, but the implementation is not limited to the above-mentioned example.

Figure 5:
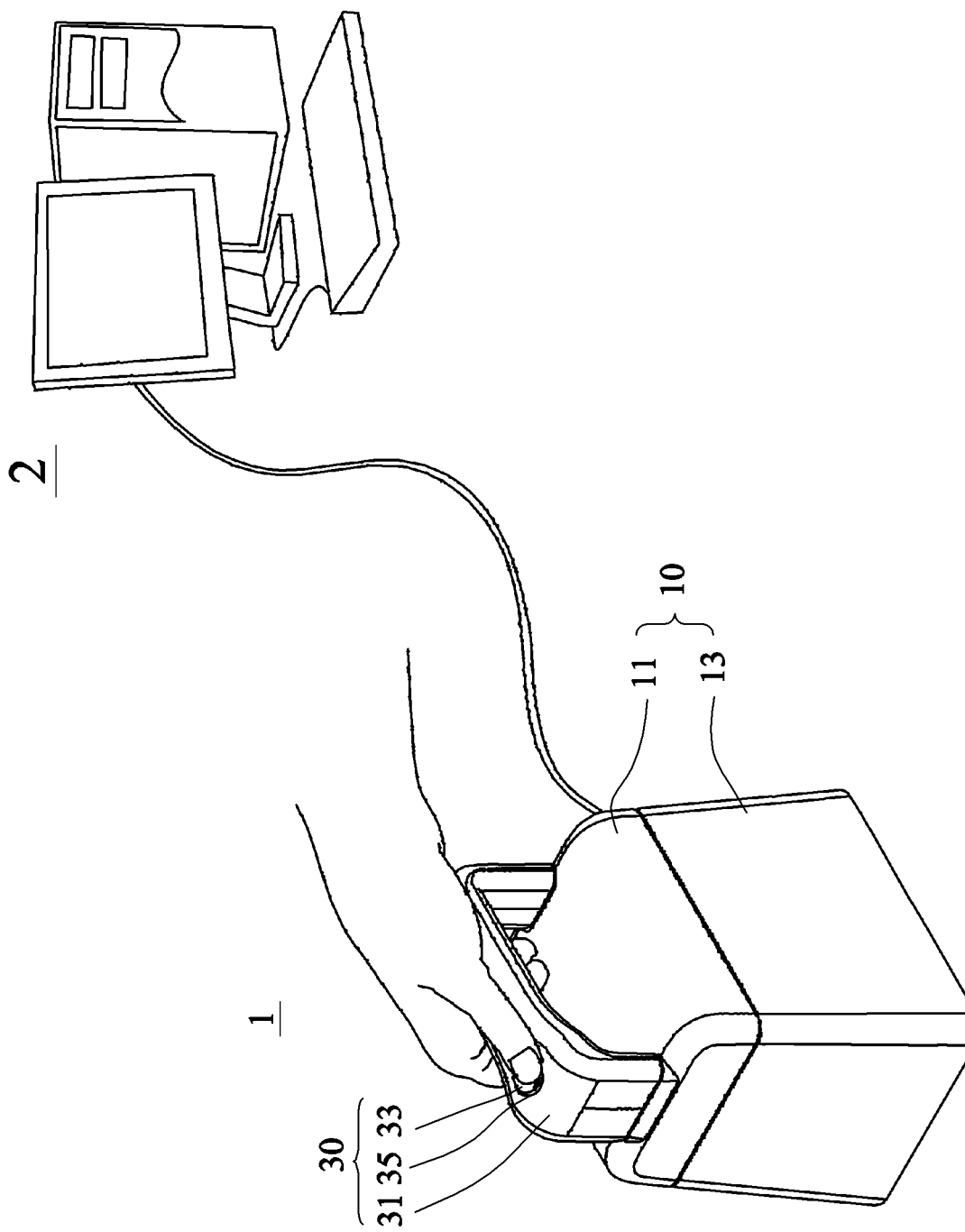
FIG. 5 is a schematic view of the portable image capture device in the used state according to the first embodiment of this disclosure.

Please refer to FIGS. 4 and 5. FIG. 4 is a block diagram of the portable image capture system of this disclosure. FIG. 5 is a schematic view of the portable image capture device in the used state according to the first embodiment of this disclosure. In FIG. 4, this disclosure further provides a portable image capture system, which includes an electronic device 2 and a portable image capture device 1. The electronic device 2 includes a processor 21, a data storage area 23 and a second signal connection assembly 27. The processor 21 is used for transmitting the image data and analyzing the received image data to obtain analyzed data. The data storage area 23 is used for storing the analyzed data. The second signal connection assembly 27 is used for transmitting an instruction of the processor 21 and receiving the image. The portable image capture device 1 includes the main body 10, the image capture assembly 40, the handle assembly 30 and the first signal connection assembly 17. The main body 10 includes the top side 12A, the bottom side 12B disposed opposite the top side 12A, and an internal space 12 disposed between the top side 12A and the bottom side 12B. The image capture assembly 40 disposed on the top side faces the bottom side and performs image capturing to generate an image signal. The handle assembly 30 disposed outside the main body 10 includes a handle part 31 and a start button 33 disposed beside the handle part, so that the user can operate with one single hand (one single hand holds the handle part 31 and controls the start button 33 at the same time to control the image capturing timings). The first signal connection assembly 17 is used for coupling/transmitting the image signal or other manipulation signals of the portable image capture device 1 to the electronic device 2. The start button 33 generates a first signal transmitted to the processor 21, and then the processor 21 correspondingly emits a second signal to enable the image capture assembly 40 to perform image capturing, and to transmit the image back to the processor 21, which analyzes the data of the image. The first signal connection assembly 17 and the second signal connection assembly 27 can be connected to each other in a wired or wireless manner to function as the channel for signal transmission.

Compared with the prior art, this disclosure utilizes the main body of the portable image capture device to concentrate the light source inside the main body, so that the image under the bottom side of the main body is fully illuminated. The handle and the start button are disposed on the main body so that the user can operate the portable image capture device with one single hand. The main work of processing information is performed by the computer or server disposed outside the electronic device, so that the components and weights of the portable image capture device can be simplified and reduced. Consequently, when the user manipulates the portable image capture device, the burden on the wrist is minimized. When the image data is transmitted to the electronic device, the electronic device can perform an optimal speed calculation and analysis and store the analyzed and identified data to the system. In this manner, this disclosure can effectively reduce the manpower and time required for generating the paper document data into the electronic system, thereby achieving the objective of data systemization.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A portable image capture device, comprising:
   a main body comprising a top surface, a bottom side disposed opposite the top surface and an internal space disposed between the top surface and the bottom side;
   an image capture assembly, which is disposed in the internal space, and faces the bottom side to perform image capturing; and
   a handle assembly comprising a handle part and a start button;
   wherein the handle assembly is disposed on the main body, and the image capture assembly is separated from the handle assembly and disposed under the top surface of the main body and above the bottom side of the main body.

2. The portable image capture device according to claim 1, wherein the main body comprises a connection part and a mask part, and the connection part abuts upon or is integrally formed jointly with the mask part.

3. The portable image capture device according to claim 2, wherein the connection part is disposed between the mask part and the handle assembly.

4. The portable image capture device according to claim 2, wherein two ends of the handle assembly are disposed on one surface of the connection part.

5. The portable image capture device according to claim 2, wherein two ends of the handle assembly are disposed on different surfaces of the connection part.

6. The portable image capture device according to claim 1, wherein two ends of the handle assembly are disposed on one surface of the main body, and the start button is disposed on a front end of the handle assembly having a width greater than a rear end of the handle assembly.

7. The portable image capture device according to claim 1, wherein two ends of the handle assembly are disposed on different surfaces of the main body, and the start button is disposed on a front end of the handle assembly having a width greater than a rear end of the handle assembly.

8. The portable image capture device according to claim 1, wherein the handle assembly further comprises an indicator, and the indicator surrounds the start button.

9. The portable image capture device according to claim 1, wherein the handle assembly further comprises an indicator, and the indicator abuts upon or is integrally formed jointly with the start button.

10. The portable image capture device according to claim 9, wherein the start button is disposed at a non-intermediate position of the handle assembly.

11. The portable image capture device according to claim 10, wherein the start button is disposed on a front end of the handle assembly.

12. The portable image capture device according to claim 1, further comprising a transparent substrate disposed on the bottom side.

13. The portable image capture device according to claim 12, wherein a material of the transparent substrate is glass, polycarbonate (PC) or acrylonitrile butadiene styrene (ABS).

14. The portable image capture device according to claim 1, wherein the image capture assembly is disposed under a gap formed between the top surface of the main body and the handle assembly.

15. A portable image capture device, comprising:
  a main body comprising a top surface, a bottom side disposed opposite the top surface, and an internal space disposed between the top surface and the bottom side;
  an image capture assembly, which is disposed in the internal space, and faces the bottom side to perform image capturing to generate an image signal;
  a handle assembly, which is disposed on the main body, wherein the image capture assembly is separated from the handle assembly and disposed under the top surface of the main body and above the bottom side of the main body and comprises a handle part and a start button; and
  a first signal connection assembly transmitting the image signal generated by the image capture assembly to an electronic device;
  wherein the electronic device is a computer or a server.

16. The portable image capture device according to claim 15, wherein the first signal connection assembly is a wired or wireless connection assembly.

17. The portable image capture device according to claim 15, wherein an interface of the first signal connection assembly is a universal serial bus (USB) interface, an Ethernet interface or a high-definition multimedia interface (HDMI) interface.

18. A portable image capture system, comprising:
  an electronic device comprising:
    a processor receiving an image and analyzing data of the image to obtain analyzed data;
    a data storage area storing the analyzed data; and
    a second signal connection assembly transmitting an instruction of the processor and receiving the image; and
  a portable image capture device, comprising:
    a main body comprising a top surface a bottom side disposed opposite the top surface, and an internal space disposed between the top surface and the bottom side;
    an image capture assembly, which is disposed in the internal space, and faces the bottom side to perform image capturing;
    a handle assembly comprising a handle part and a start button, wherein the image capture assembly is separated from the handle assembly and disposed under the top surface of the main body and above the bottom side of the main body, wherein the handle part abuts upon the start button; and
    a first signal connection assembly transmitting the instruction of the processor and transmitting the image;
  wherein the start button generates a first signal transmitted to the processor, and then the processor correspondingly emits a second signal to enable the image capture assembly to perform image capturing, and to transmit the image back to the processor, which analyzes the data of the image.

19. The portable image capture system according to claim 18, wherein the first signal connection assembly and the second signal connection assembly are mutually connected together to function as a signal transmitting channel.

20. The portable image capture system according to claim 18, wherein the first signal connection assembly and the second signal connection assembly are connected together in a wired or wireless manner.

* * * * *